United States Patent [19]

Goller

[11] Patent Number: 5,291,856
[45] Date of Patent: Mar. 8, 1994

[54] DOG LEASH HAVING STIFFENING MEMBER ON DISTAL END THEREOF

[76] Inventor: Nathan Goller, 9446 Beverly Crest Dr., Beverly Hills, Calif. 90201

[21] Appl. No.: 972,858

[22] Filed: Nov. 6, 1992

[51] Int. Cl.$^5$ ............................................. A01K 27/00
[52] U.S. Cl. ........................................ 119/795; 54/34; 119/858
[58] Field of Search ................. 119/96, 106, 109, 118, 119/120; 54/34, 64

[56] References Cited

U.S. PATENT DOCUMENTS

| | | | |
|---|---|---|---|
| 54,729 | 5/1866 | Howe | 119/109 |
| 236,091 | 12/1880 | Rodger | 119/109 |
| 548,062 | 10/1895 | Joyner | 119/109 |
| 3,395,675 | 8/1968 | Fowlkes | 119/120 |
| 3,722,478 | 3/1973 | Smith | 119/120 |
| 3,870,296 | 3/1975 | Ellis | 119/109 |
| 4,167,156 | 9/1979 | Kupperman et al. | 119/109 |
| 4,563,981 | 1/1986 | Kramer | 119/109 |
| 4,735,035 | 4/1988 | Mattioli | 119/109 |
| 4,998,507 | 3/1991 | Browning | 119/106 |

Primary Examiner—Gene Mancene
Assistant Examiner—Todd E. Manahan
Attorney, Agent, or Firm—Gregory J. Nelson

[57] ABSTRACT

An animal leash of a flexible material has a fastener at the distal end. A section of the leash adjacent the distal end is stiffened or reinforced to minimize the tendency of a slackened leash to become entangled beneath the animal's body. The reinforcement may be a rigid shaft or an interior or exterior wire member.

7 Claims, 1 Drawing Sheet

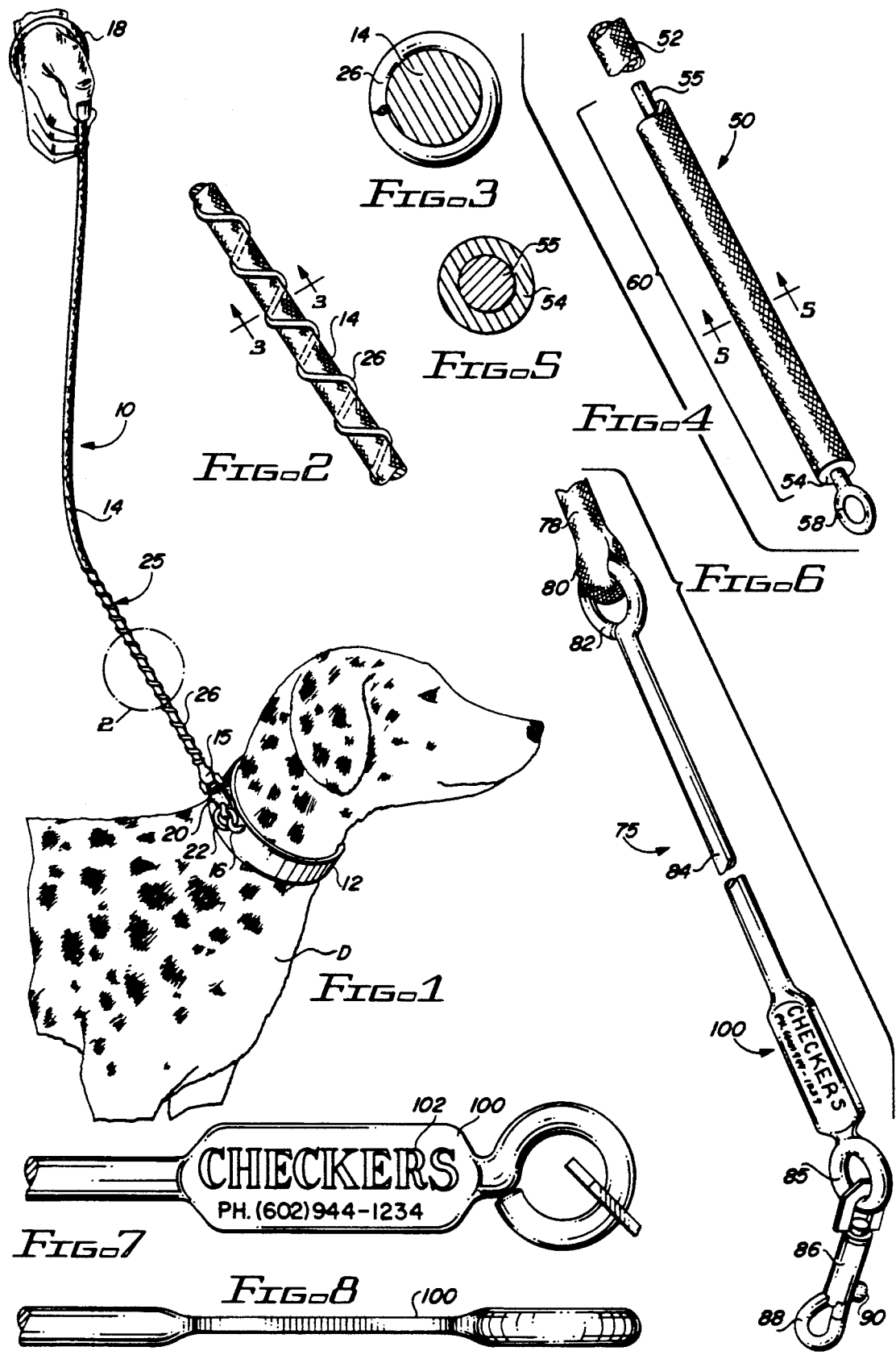

DOG LEASH HAVING STIFFENING MEMBER ON DISTAL END THEREOF

The present invention relates to a pet leash and more particularly to a pet leash for canines and other animals which prevents the animal from becoming entangled in the leash when walking or exercising the pet.

It is common practice for owners of canines and other four-legged pets to regularly walk or exercise the pet. Proper control of the animal and laws of most municipalities require that such pets be restrained on a leash. The leash is normally connected to a harness, collar or chain and consists of a flexible member such as a strap or chain which is held by the pet owner or handler. The problem with conventional leashes is that when the leash becomes slack, as for example, when the animal stops or is walking in the proper "heel" position, the slack leash will assume a position along one shoulder and foreleg of the animal. Thus, it is very easy for the animal to step over the leash so that the leash now extends from the collar, between the forelegs and upwardly around the side of the animal. The pet owner/handler must generally command or cause the animal to stop, reach down, lift the animal's leg and remove the leash. This can become interruptive to the walk and somewhat irritating to the owner/handler.

Accordingly, it is a principal object of the present invention to provide an improved leash for dogs and other animals which leash has a stiffened section adjacent the distal end of the leash, which section minimizes the tendency of the leash to become slack and entangled beneath the animal's body.

Briefly, the present invention comprehends a leash of a flexible material such as chain, cord or woven material. The lower or distal end of the leash has a fastener for connection to the chain, collar or harness which extends about the animal's neck or body. A section extending a predetermined length of the distal end is stiffened or reinforced. The reinforcement may consist of an exteriorly attached rigid coil of wire or similar material. In alternate embodiments, the distal end comprises a rigid shaft to which the leash attaches or which may be in the form of an insert extending interiorly along the distal end of the leash. The stiffening member may include provision for decoration or indicia such as an identification tag carrying the dogs name, owner's name and telephone number and other identifying information.

The above and other objects and advantages of the present invention win become more apparent from the following description, claims and drawings in which:

FIG. 1 is a perspective view showing a preferred form of the leash of the present invention attached to a collar about the neck of a Dalmatian dog;

FIG. 2 is an enlarged detail view of a portion of the distal end of the leash as indicated in FIG. 1;

FIG. 3 is a sectional view taken along line 3—3 of FIG. 1;

FIG. 4 is a perspective view of the lower, distal end of the dog leash according to the present invention illustrating another embodiment of the present invention;

FIG. 5 is a sectional view taken along line 5—5 of FIG. 4;

FIG. 6 is a perspective view illustrating still another embodiment of the present invention;

FIG. 7 is a top view of the lower end of the stiffening section of the leash shown in FIG. 6; and FIG. 8 is a side view of the lower end of the stiffening section shown in FIG. 7.

Turning now to the drawings, particularly FIGS. 1 to 3, the dog leash according to the present invention is shown and is generally designated by the numeral 10. The leash is shown attached to a conventional dog collar 12 extending about the neck of a dog D, shown as a Dalmatian. The term "collar" as used herein shall mean any restraint extending about the animal such as a collar, harness, chain or the like. The leash 10 has an elongate flexible section 14 which extends from the lower or distal end 15 to the upper end which is shown and formed as a loop 18 through which the handler's hand may extend. The lower distal end is attached to a swivel 20 having an openable and closable snap hook 22 which is securable to the eyelet 16 on the collar.

In order to minimize the entanglement of the leash beneath a four-legged animal, a portion of the leash extending substantially from the distal end 15 upwardly along the leash is stiffened or reinforced as indicated by numeral 25. Stiffening is accomplished by an exteriorly positioned spirally coiled member 26 formed of wire-like material which may be plastic or metal. As shown in FIG. 1, even though the remainder of the leash flexes or bends, the stiffened section remains substantially linear or straight. Thus, when the leash is slackened, the stiffened section will assume a position extending outwardly or downwardly from the collar or may assume a position along the animal's body, but in any event will normally be positioned so as the animal will not easily be able to step over the stiffened section, thus becoming entangled. Thus, the inclusion of the stiffened section makes it more difficult for the animal to step over the leash when the leash is loosened or slackened. The stiffened section 25 will typically extend for approximately one foot from the lower or distal end 15 of the leash upwardly along the leash. The leash 10 may be of any conventional leash material and may be a chain, leather strap or woven cord material.

FIGS. 4 and 5 show an alternate embodiment of the present invention which is generally designated by the numeral 50. In this embodiment, the leash includes an elongate flexible strap or cord 52 having an upper end, not shown, and a lower end 54. A rigid rod 55 extends axially within the flexible member from the lower or distal end 54 a predetermined distance along the member to establish a stiffened section 60. The insert rod may be metal or plastic and terminates at a lower end at a loop or eyelet 58 which may be attached to a conventional swivel for attachment to the animal collar. The interiorly received stiffening section serves the purpose of maintaining a portion of the leash rigid or stiff at the lower end while the remainder of the leash may be flexible preventing entanglements as described above.

FIG. 6 shows still another embodiment of the present invention which is generally designated by the numeral 75. Embodiment 75 has flexible strap or cord member 78 shown as a woven material having an upper end, not shown, and a lower end terminating at a knot or loop 80 to which is attached the eyelet 82 located at the upper end of an axially extending rod or shaft 84. An elongate rod or shaft 84 is of stiffer rigid material and terminates at its lower end at another eyelet 85 to which may be attached a swivel 86 having snap hook member 88. The snap hook member is openable at projection 90 to allow it to be attached to a collar. The rigid shaft 84 extends a predetermined distance from the swivel upwardly, as for example about one foot, and provides rigidity to prevent the leash portion from becoming entangled beneath the animal when the leash is slackened.

The lower end of the rod 84 carries an indicia section 100. Indicia section 100 is shown as a flattened portion carrying suitable indicia 102 such as the name of the dog and identification of the owner and the owner's phone number.

To add further aesthetic appeal to the leash, the leash may also include suitable ornamentation or decoration such as rhinestones or the like. The stiffening member such as members 26 and 84 may be provided in suitable colors such as fluorescent colors for safety, particularly when animals are walked at night.

It will be obvious that the foregoing provides a simple and unique animal leash which provides significant advantages to animal handlers, such as dog owners.

It will be obvious to those skilled in the art to make various changes, alterations and modifications to the animal leash described herein. To the extent such changes, alterations and modifications do not depart from the spirit and scope of the appended claims, they are intended to be encompassed therein.

I claim:
1. A leash for an animal comprising:
   (a) an elongate flexible member having opposite first and second ends, said first end to be held by the animal handler and the second end having attachment means detachably securably to a collar extending about the animal;
   (b) stiffening means associated with a predetermined section of said flexible member extending from approximate the second end a predetermined distance whereby the section tends to not become entangled under the animal when the leash is slackened, said stiffening means comprising a coiled member extending about the flexible member.
2. The leash of claim 1 wherein said coiled member comprises a helically extending wire.
3. The leash of claim 2 wherein said wire is plastic.
4. The leash of claim 2 wherein said wire is metal.
5. The leash of claim 1 further including indicia means associated therewith.
6. The leash of claim 1 wherein said first end of said leash includes a handle.
7. The leash of claim 1 including a high visibility section on said leash.

* * * * *